(12) United States Patent
Meyrenaud et al.

(10) Patent No.: US 11,644,168 B2
(45) Date of Patent: May 9, 2023

(54) OPTICAL SYSTEM (71) Applicant: VALEO VISION, Bobigny (FR)

(72) Inventors: Jean Luc Meyrenaud, Bobigny (FR); Kostadin Beev, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/601,549

(22) PCT Filed: Apr. 6, 2020

(86) PCT No.: PCT/EP2020/059821
§ 371 (c)(1),
(2) Date: Oct. 5, 2021

(87) PCT Pub. No.: WO2020/212191
PCT Pub. Date: Oct. 22, 2020

(65) Prior Publication Data
US 2022/0205605 A1    Jun. 30, 2022

(30) Foreign Application Priority Data
Apr. 19, 2019    (FR) ..................... 1904234

(51) Int. Cl.
*F21S 41/25*    (2018.01)
*G02B 27/09*    (2006.01)
*F21Y 115/10*    (2016.01)
*F21S 41/147*    (2018.01)

(52) U.S. Cl.
CPC .......... *F21S 41/25* (2018.01); *G02B 27/0961* (2013.01); *F21S 41/147* (2018.01); *F21Y 2115/10* (2016.08)

(58) Field of Classification Search
None
See application file for complete search history.

(56) References Cited

U.S. PATENT DOCUMENTS

2016/0126425 A1    5/2016  Li et al.

FOREIGN PATENT DOCUMENTS

| CN | 201166288 Y | 12/2008 | |
|---|---|---|---|
| EP | 2770248 A1 | 8/2014 | |
| FR | 2975462 A1 * | 11/2012 | ........... B60Q 1/0041 |

OTHER PUBLICATIONS

European Patent Office, International Search Report (w/English Translation) and Written Opinion of corresponding Application No. PCT/EP2020/059821, dated Jun. 2, 2020.

* cited by examiner

*Primary Examiner* — Elmito Breval
(74) *Attorney, Agent, or Firm* — Valeo Vision (57) ABSTRACT

The invention relates to an optical device for a vehicle with at least one lens comprising an optical axis, an output diopter, and an input diopter. The device including a light source arranged to emit light towards the input diopter of the at least one lens, with the at least one lens having an object focus located substantially on the input diopter of the lens. A section of the output diopter in a vertical plane parallel to the optical axis of the at least one lens includes one or more elliptical or substantially elliptical arcs which are modified relative to a reference elliptical shape, in which all the rays coming from the light source would be emitted parallel to the optical axis of the at least one lens at the output of a reference output diopter.

19 Claims, 7 Drawing Sheets

OPTICAL SYSTEM

CROSS-REFERENCE TO RELATED APPLICATIONS

This is a 371 application (submitted under 35 U.S.C. § 371) of International Application No. PCT/EP2020/059821 (WO2020212191) filed on Apr. 6, 2020, which claims the priority date benefit of French Application No. FR1904234 filed on Apr. 19, 2019, the disclosures of which are hereby incorporated by reference in their entirety.

TECHNICAL FIELD

The invention relates to an optical device for illuminating the sides of a vehicle.

BACKGROUND

With the development of autonomous motor vehicles, it is becoming necessary to improve driver assistance under all lighting conditions, especially with a view to managing various particular driving functions, including:
"lane keeping", which function allows a vehicle to follow its lane on a road, especially by detecting any deviation in path and signaling it to the driver;
"lane centering", which function complements the preceding function, and more precisely allows the vehicle to be kept in the center of its lane autonomously,
"lane changing", which function allows a vehicle to change lane, for example with a view to overtaking,
"autonomous emergency braking" (or more simply AEB),
"autonomous emergency steering" (or more simply AES), which function allows an obstacle present in the lane to be avoided,
"parking assistance", and "autonomous parking".

SUMMARY

In these various functions, the assisting device needs to receive input information, especially including information regarding the detection of ground markings, such as the lines bounding lanes, and/or the presence of any obstacles on the road. This detection must be able to be carried out under all conditions, and especially at night.

It will be noted that existing vehicle lighting allows the road in front of the vehicle to be illuminated from a distance of two meters in the vehicle's own lane, and five meters in adjacent lanes.

However, illuminating the lateral region beside the vehicle is more difficult because the illumination must cover the entirety of a rectangular area adjacent to the vehicle, which area extends from a few centimeters to several meters from the vehicle and over a length of about ten meters. The angular extent of this region to be illuminated makes it very difficult to illuminate this entire area uniformly.

These constraints mean that, at the present time, it is difficult, if not impossible, to be able to detect certain ground markings or obstacles in proximity to a vehicle, especially in lateral regions, this preventing provision of an assisting device able to perform the aforementioned functions, which are required by autonomous vehicles.

The aim of the invention is to provide a device and method for illuminating a lateral region of a vehicle that remedy the above drawbacks and improve devices and methods for assisting with driving a motor vehicle, especially allowing them to perform the aforementioned assistance functions, so as to make them suitable for assisting an autonomous vehicle.

In addition, the aim of the invention is to provide a solution for providing illumination and assisting with driving a motor vehicle that is simple and reliable while not generating excessively high extra costs.

To this end, the invention relates to an optical device for a vehicle. Said optical device comprises at least one lens comprising an optical axis and an exit dioptric interface and an entrance dioptric interface. Said optical device also comprises a light source arranged to emit light toward the entrance dioptric interface of the at least one lens, the at least one lens having an object focal point located substantially on the entrance dioptric interface of the lens, on its optical axis. A section of the exit dioptric interface through a vertical plane parallel to the optical axis of the at least one lens comprises one or more arcs that are elliptical or substantially elliptical, and modified with respect to a reference elliptical shape that would cause all the rays generated by the light source to be emitted parallel to the optical axis of the at least one lens, on exiting a reference exit dioptric interface, this modification being such that all or some of the rays emitted by the at least one lens of the optical device are similarly inclined in a direction not parallel to the optical axis, in a manner suitable for an illumination of the ground when the optical device is arranged within a motor vehicle with its optical axis horizontal.

In one embodiment, a section of the upper portion of the exit dioptric interface of the at least one lens through a vertical plane parallel to the optical axis of the at least one lens comprises one or more arcs that are elliptical or substantially elliptical, and modified with respect to a reference elliptical shape that would cause all the rays to be emitted parallel to the optical axis of the at least one lens, so that all or some of the rays emitted by the upper portion of the at least one lens are inclined toward the optical axis of the at least one lens, and/or in that a section of the lower portion of the exit dioptric interface of the at least one lens through a vertical plane parallel to the optical axis of the at least one lens comprises one or more arcs that are elliptical or substantially elliptical, and modified with respect to a reference elliptical shape that would cause all the rays to be emitted parallel to the optical axis of the at least one lens, so that all or some of the rays emitted by the lower portion of the at least one lens are inclined so as to diverge from the optical axis of the at least one lens.

In one embodiment, a section of the upper portion of the exit dioptric interface of the at least one lens through a vertical plane parallel to the optical axis of the at least one lens comprises one or more arcs that are elliptical or substantially elliptical, and inscribed between a reference elliptical outline that would cause all the rays to be emitted parallel to the optical axis of the at least one lens and an elliptical outline obtained by decreasing the length of the minor axis of the reference elliptical outline by 30%, and/or in that a section of the lower portion of the exit dioptric interface of the at least one lens through a vertical plane parallel to the optical axis of the at least one lens comprises one or more arcs that are elliptical or substantially elliptical, and inscribed between a reference elliptical outline that would cause all the rays to be emitted parallel to the optical axis of the at least one lens and an elliptical outline obtained by increasing the length of the minor axis of the reference elliptical outline by 30%.

In one embodiment, a section of the upper portion of the exit dioptric interface of the at least one lens through a vertical plane parallel to the optical axis of the at least one lens comprises an upper elliptical arc and a lower elliptical arc, which are separated by a continuous border at their intersection with the optical axis, the two elliptical arcs having the same center and the same focal point coincident with the object focal point of the lens, and characterized in that the upper elliptical arc and/or the lower elliptical arc has an eccentricity allowing the light rays generated by the light source to be deflected so as to incline them toward and/or incline them away from the optical axis, respectively.

In one embodiment, the length of the minor axis of the upper elliptical arc is 5 to 30% smaller than the length of the minor axis of a reference elliptical arc.

In one embodiment, the length of the minor axis of the lower elliptical arc is 5 to 30% larger than a length of the minor axis of a reference elliptical arc.

In one embodiment, the rays output from the exit dioptric interface are all oriented toward a horizontal plane parallel to the optical axis, and are all able to illuminate a ground on which a vehicle in which the optical device might be mounted would rest.

In one embodiment, the exit dioptric interface is arranged perpendicular to the optical axis.

In one embodiment, the light source is placed in proximity to the entrance dioptric interface, the distance between the light source and the entrance dioptric interface in particular being smaller than 10 mm.

In one embodiment, the light source is contiguous to the entrance dioptric interface.

In one embodiment, the lens comprises, between the entrance dioptric interface and the exit dioptric interface, a lateral face, which is preferably arranged to contain the whole of the emission cone formed by the light rays emitted by the light source and propagating through the lens.

In one embodiment, a section of the exit dioptric interface through a horizontal plane containing the optical axis has a substantially parabolic shape.

The invention also relates to a lighting system intended to be mounted on the rocker panel of a vehicle, especially of a motor vehicle, comprising a plurality of optical devices according to the invention.

The invention also relates to a motor vehicle, especially an autonomous or semi-autonomous motor vehicle, comprising one or more optical devices according to the invention or one or more lighting systems according to the invention, arranged in the lower and lateral portion of the motor vehicle.

BRIEF DESCRIPTION OF THE DRAWINGS

The accompanying drawings show, by way of example, one embodiment of an optical device according to the invention and of a vehicle comprising such a module.

DETAILED DESCRIPTION

By convention, below we will use the three directions x, y, z in relation to a vehicle positioned on a horizontal plane, within which vehicle an optical device according to the invention is intended to be integrated, into a lateral flank, to achieve illumination of the lateral region of said motor vehicle. The y direction represents the longitudinal direction, oriented from the rear to the front of the motor vehicle. The x direction corresponds to the transverse direction, oriented from left to right. The z direction corresponds to the vertical direction. The x, y directions thus define a horizontal plane. These directions will thus be used extensively to describe an optical device alone, with reference to its future position within a motor vehicle.

An example of a lens 2 of an optical device 1 according to one embodiment is described below with reference to FIGS. 1, 2 and 4 to 6. The lens 2 comprises an entrance dioptric interface 3, an exit dioptric interface 4, and a lateral face 7 arranged between the two dioptric interfaces. The dioptric interfaces comprise a central point about which they are arranged substantially symmetrically. The axis connecting these two central points represents an optical axis X of the lens.

The optical device 1 according to the embodiment comprises at least one light source 5 capable of emitting light toward the entrance dioptric interface 3 of the lens 2. Preferably, the light source 5 and the lens 2 are arranged so that the light rays generated by the light source and that reach the lens propagate in a straight line, these rays not undergoing any refraction on their path between the light source 5 and the exit dioptric interface 4 of the lens 2. The exit dioptric interface 4 then orients these light rays toward the exterior. According to the embodiment, the lens 2, and more particularly the exit dioptric interface 4, is designed to make it possible to illuminate the lateral region of a motor vehicle, in proximity to a motor vehicle, with a view to achieving the targeted region of illumination recalled above.

Furthermore, the lens, and particularly the shape of the exit dioptric interface 4, is designed so as to allow the production of a compact optical device. By way of example, the distance separating the light source 5 from the entrance dioptric interface 3 may be smaller than or equal to 10 mm, or even smaller than or equal to 3 mm. Preferably, the light source 5 is contiguous to the entrance dioptric interface 3. Alternatively, the entrance dioptric interface 3 may form a cavity that at least partially accommodates the light source 5.

According to the embodiment, the exit dioptric interface 4 has a substantially parabolic shape (a segment of a parabola) in section through a horizontal plane, especially a horizontal plane comprising the optical axis X, as will be detailed below. This shape allows a good right and left distribution of the light rays leaving the exit dioptric interface 4, i.e. a good distribution of the illumination in the longitudinal direction y of a motor vehicle. As a variant, this shape in section through a horizontal plane could be different. In addition, in section through a vertical plane, especially a vertical plane comprising the optical axis X of the lens 2, the exit dioptric interface 4 has a shape close to that of an ellipse (and more precisely of one or more elliptical segments or elliptical arcs). This shape is more particularly designed to orient the light rays toward the ground in proximity to the vehicle, i.e. with a predefined maximum range, so as to illuminate the region that is useful in terms of correct operation of an autonomous vehicle, as mentioned above, in the transverse direction x.

The optical lens 2 has an optical axis X that is oriented parallel to the transverse direction x, and that corresponds both substantially to the axis of symmetry of the aforementioned parabolic shape and to a major axis of the aforementioned substantially elliptical shape. The lens is thus designed to have its optical axis in a horizontal plane within a motor vehicle positioned on a horizontal plane.

Preferably, the optical axis X is also the main axis of the beam emitted by the light source 5, i.e. the axis on which the light intensity is highest. It will be noted that, according to one embodiment, a plurality of light sources 5 could be arranged close to one another, around the optical axis X, to allow illumination of higher power to be generated. To simplify the description, only a single light source will be considered to be present below, even though in practice said light source could be formed by combining a plurality of separate light sources.

More precisely, the light source 5 is positioned in the focal plane of the lens 2, i.e. in a plane located on the object focal line of the lens 2 and perpendicular to the optical axis X. Yet more precisely, the light source 5 is arranged at the object focal point F of the lens 2, and located in the vicinity of the entrance dioptric interface 3, at the intersection between the optical axis X and the focal plane P.

The light source 5 may comprise a light-emitting diode comprising an emitting surface 6 capable of emitting light toward the entrance dioptric interface 3 of the lens 2. Preferably, the emitting surface 6 is arranged parallel to the focal plane P of the lens 2 and intersects the optical axis X. Very preferably, the light-emitting surface 6 is contiguous to the entrance dioptric interface 3. The entrance dioptric interface 3 shown is flat and lies entirely in front of the photo-emitting surface 6 of the light source 5.

The lens 2 may comprise, between the entrance dioptric interface 3 and the exit dioptric interface 4, a lateral face 7, which is preferably arranged to contain the whole of the emission cone formed by the light rays emitted by the light source 5 and propagating through the lens 2. Preferably, the lateral face 7 is substantially parallel to the emission cone formed by the light rays emitted by the light source 5 and propagating through the lens 2. The lateral face 7 may have a shape that is substantially divergent toward the exit optical dioptric interface 4 of the lens 2.

The lateral face 7 may be formed from a plurality of contiguous facets 8 joined by ridges 11 that extend the length of the face 7, from the entrance dioptric interface 3 to the exit dioptric interface 4.

Figure 1:
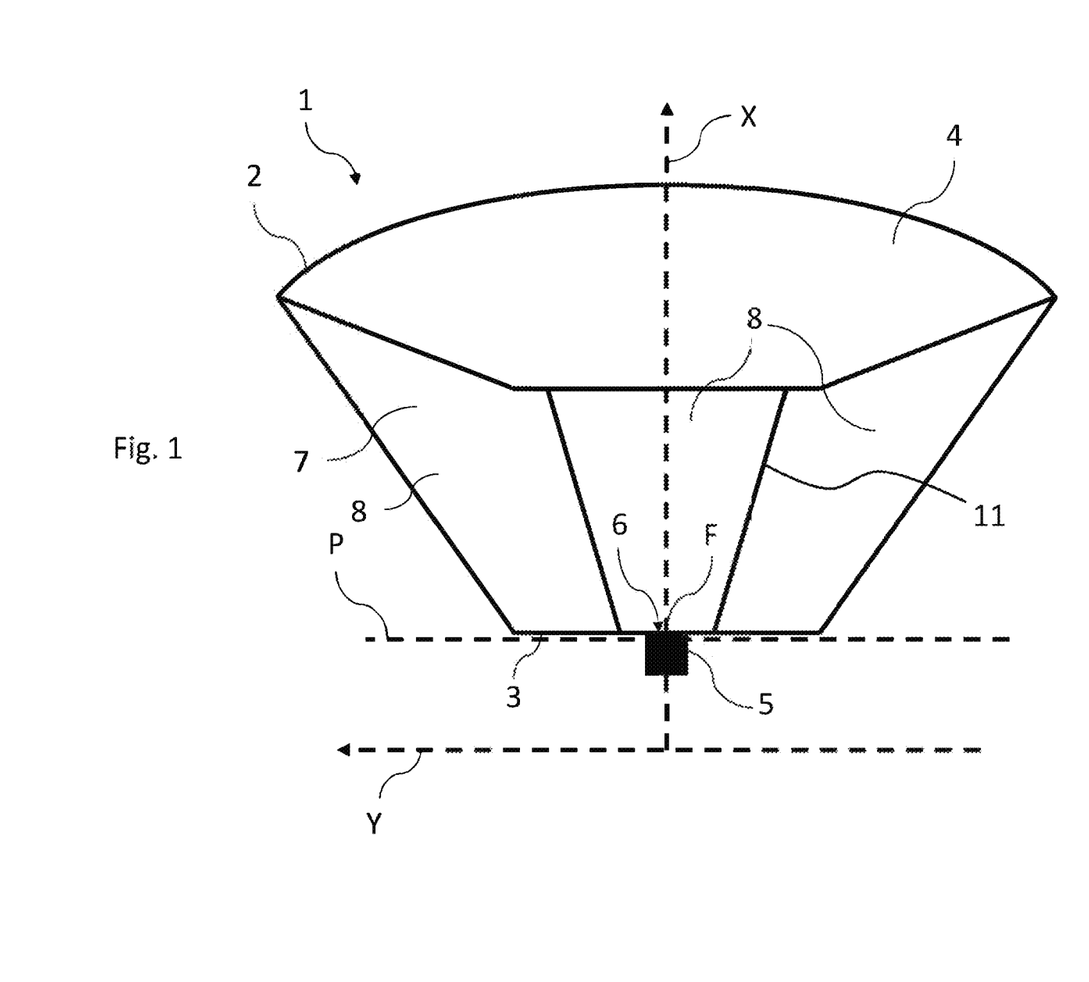
FIG. 1 shows a top view of an optical device according to one embodiment of the invention.
Figure 2:
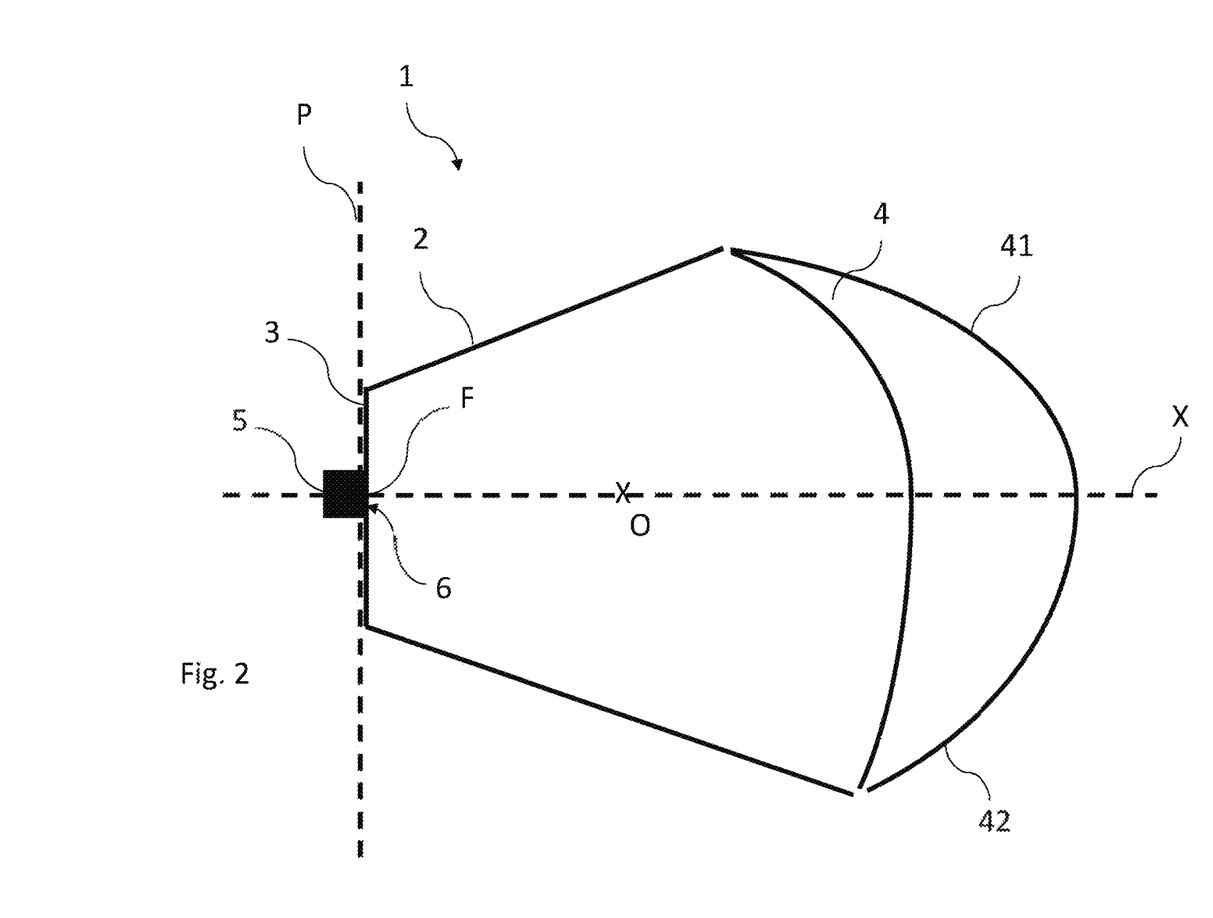
FIG. 2 shows a side view of an optical device according to one embodiment of the invention.

As illustrated in FIG. 2, the intersection of the exit dioptric interface 4 with a vertical plane comprising the optical axis X comprises two elliptical arcs, an upper elliptical arc 41 and a lower elliptical arc 42.

Each elliptical arc 41, 42 has an object focal point (not shown) that is coincident with the object focal point F of the lens 2. Each elliptical arc 41, 42 has the same center of ellipse O located on the optical axis X.

Preferably, the exit dioptric interface 4 consists of these two elliptical arcs 41, 42. The two elliptical arcs 41, 42 are preferably adjacent. Preferably, the border between the two elliptical arcs 41, 42 is continuous. In one embodiment, the two elliptical arcs 41, 42 each lie on one side of the optical axis X. The boundary between the two elliptical arcs 41, 42 may comprise a point of the optical axis X.

Figure 3:
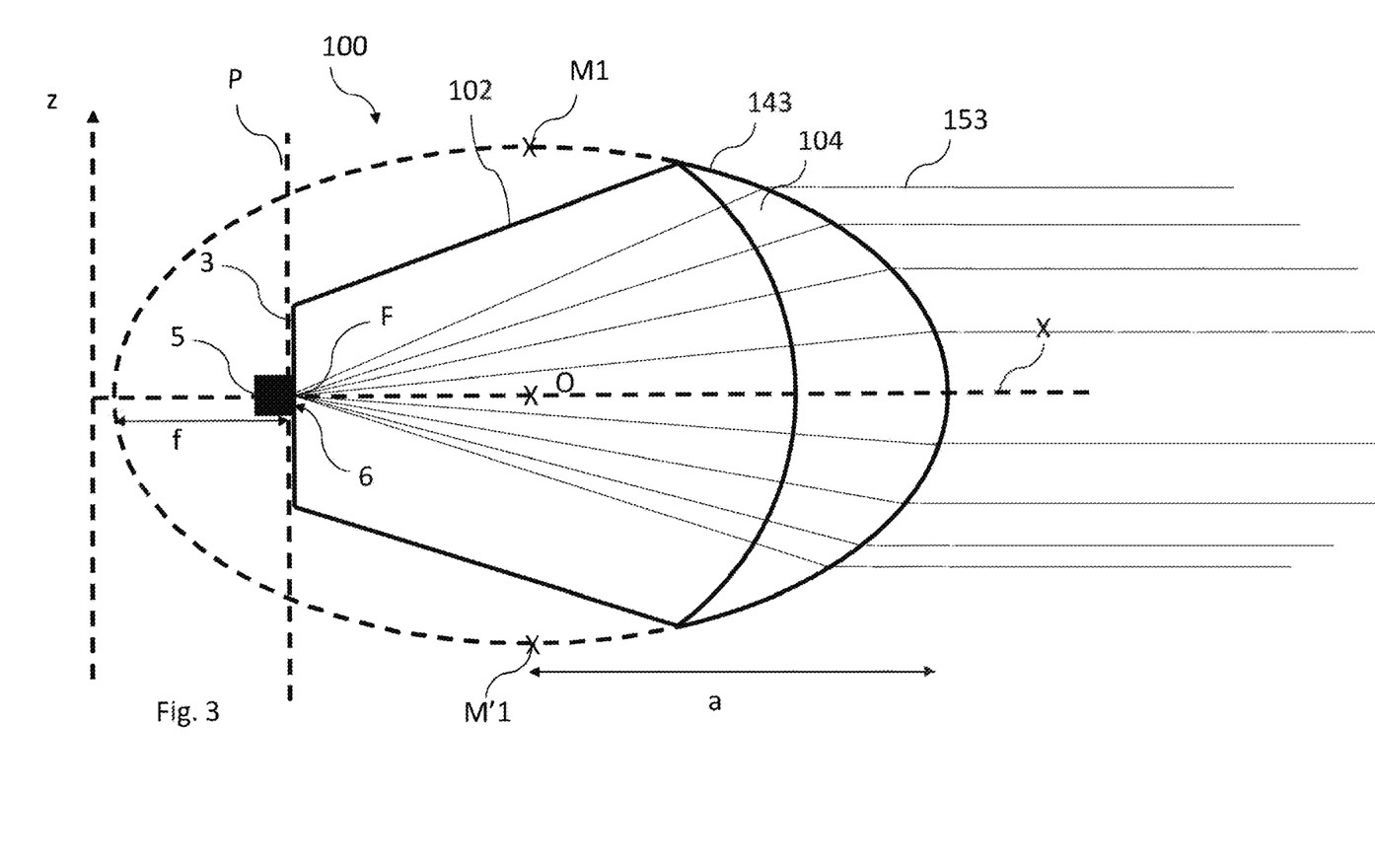
FIG. 3 shows a side view of a reference optical device.

There is one particular form of such an optical device, which will be considered to be the reference optical device 100, this reference optical device, which is illustrated in FIG. 3, comprising a reference lens 102 the intersection of the reference exit dioptric interface 104 of which with a vertical plane comprising the optical axis describes a reference elliptical arc 143, the corresponding ellipse of which has a focal point coincident with the object focal point F of the lens. The reference elliptical arc 143 may be defined by the length of its minor axis OM1 or OM'1, where O is the center of the ellipse and the reference points M1 and M'1 are opposite ends of the two minor axes of the reference ellipse 143. The three points O, M1 and M'1 are aligned in a vertical direction.

The reference exit dioptric interface 104 comprises an elliptical arc the length of the reference minor axis OM1 or OM'1 of which is configured so that the light rays 153 generated by the light source 5 and transmitted by the reference exit dioptric interface 104 are mutually parallel and parallel to the optical axis X.

This particular length is dependent on the focal length f of the lens, on the refractive index n of the material of the lens and on the half-length of the major axis a.

The distance FM1 allowing an elliptical exit-dioptric-interface arc to be obtained that allows such rays parallel to the optical axis X to be obtained is given by the following equation:

$$FM1 = \sqrt{a^2(a-f)^2} \quad \text{[Math. 1]}$$

$$a = \frac{(1-n)f}{2 - \frac{1}{n} - n} \quad \text{[Math. 2]}$$

From FM1, it is easily possible to obtain the length of the minor axis OM1 of the elliptical arc using following relationship:

$$OM1 = \sqrt{FM1^2 - (a-f)^2} \quad \text{[Math. 3]}$$

Figure 4:
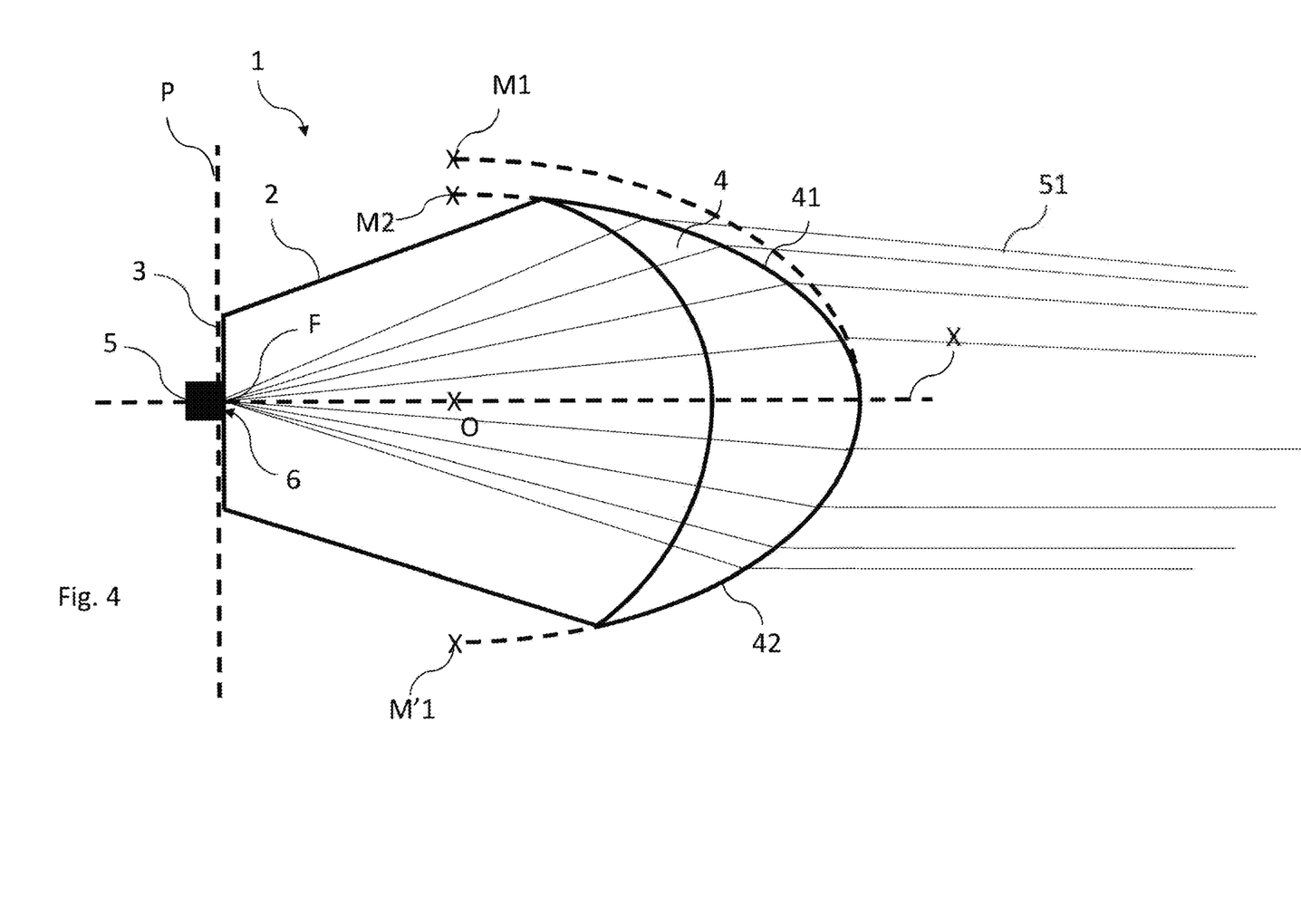
FIG. 4 shows a side view of an optical device according to a first embodiment of the invention.
Figure 5:
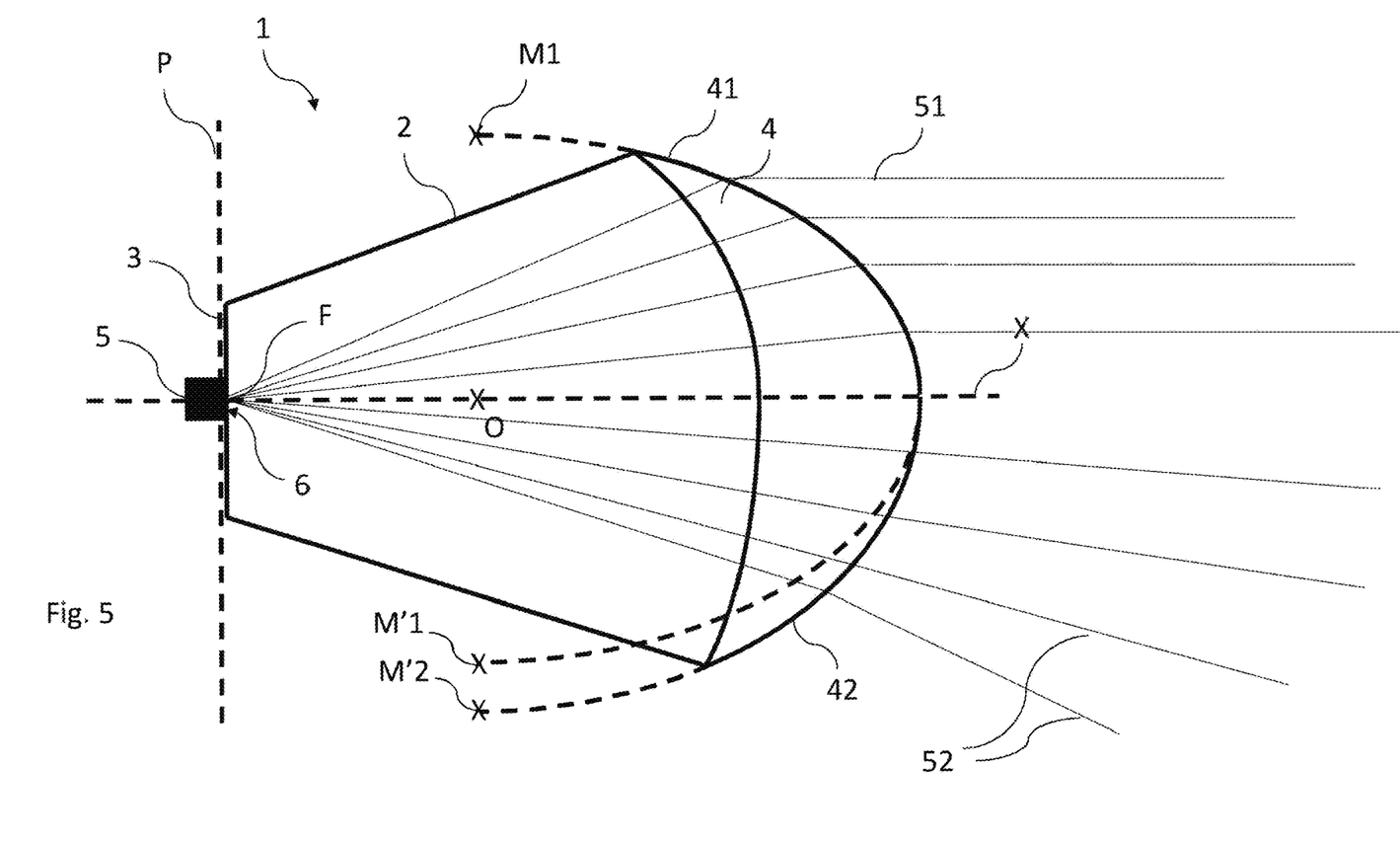
FIG. 5 shows a side view of an optical device according to a second embodiment of the invention.
Figure 6:
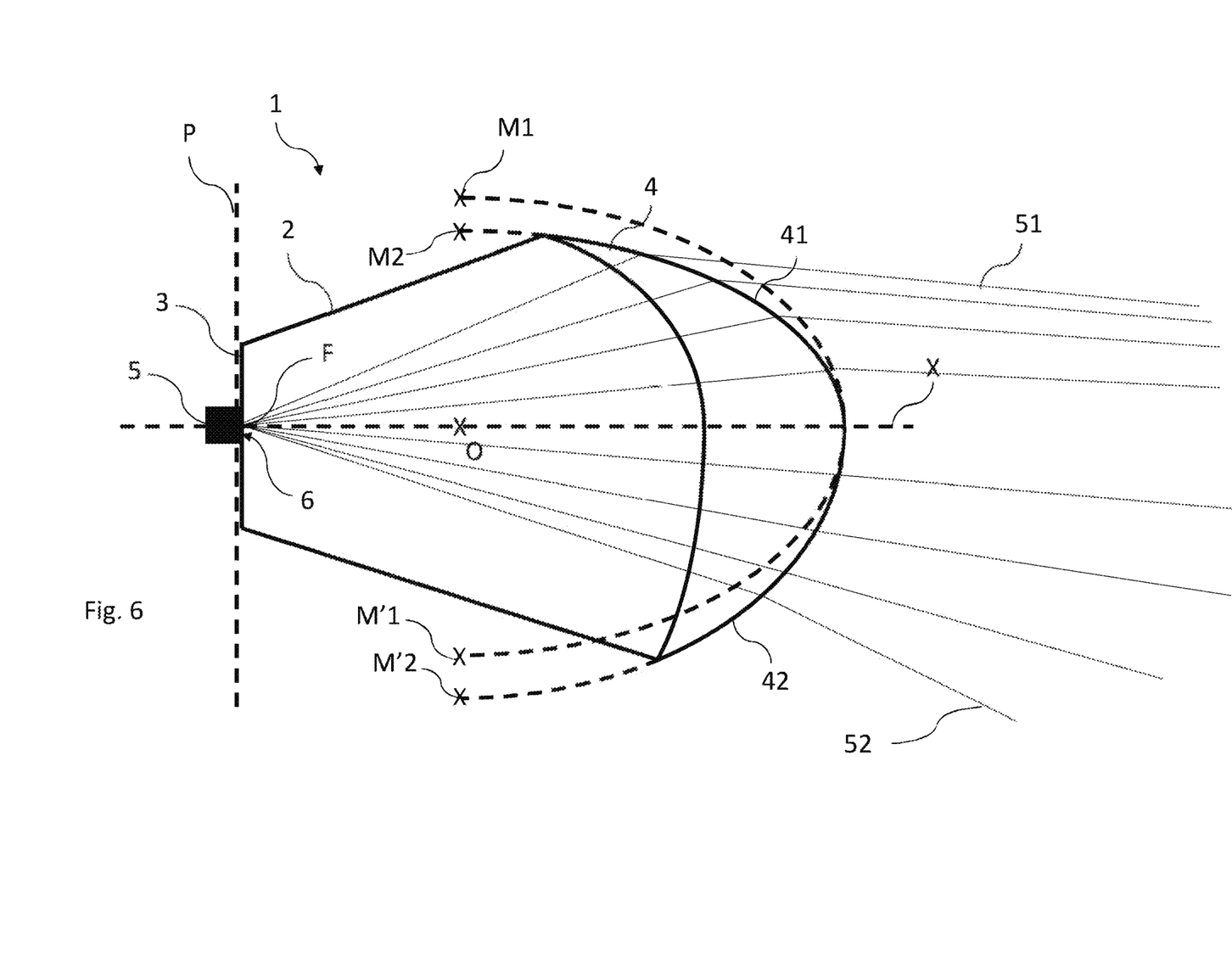
FIG. 6 shows a side view of an optical device according to a third embodiment of the invention.

FIGS. 4 to 6 illustrate side views of embodiments of a lens for an optical device according to the invention, i.e. views in section through a vertical plane comprising the optical axis.

FIG. 4 illustrates an optical device 1 according to a first embodiment of the present invention.

In this first embodiment, the eccentricity of the upper elliptical arc 41 of the exit dioptric interface 4 is decreased with respect to the eccentricity of an elliptical arc that would permit the light rays output from the exit dioptric interface 4 to be parallel (dashed line in FIG. 4), i.e. with respect to the reference ellipse of FIG. 3 described above.

In other words, in this embodiment, the distance of the minor axis of the upper elliptical arc OM2 is smaller than the reference distance OM1 allowing mutually parallel refracted rays to be obtained. Thus, the light rays 51 generated by the light source 5 and transmitted by the upper elliptical arc 41 of the exit dioptric interface 4 are deviated so as to be oriented toward the optical axis X in a vertical plane. The light rays 51 generated by the light source 5 and refracted by the upper elliptical arc 41 of the exit dioptric interface 4 are thus deviated so as to converge more rapidly on the ground when the optical device is arranged in a lateral region of a vehicle.

At their intersection with the optical axis X, there is still a continuity between the upper elliptical arc 41 of the exit dioptric interface 4 and the lower elliptical arc 42.

The distance OM2 of the minor axis of the upper elliptical arc 41 is smaller than the distance OM1 allowing refracted rays parallel to the optical axis X to be obtained, i.e. than the minor axis of the reference ellipse 143 of the reference exit dioptric interface 104. Preferably, the distance OM2 of the minor axis of the upper elliptical arc is smaller than the reference distance OM1 by at least 0.2 mm, or even smaller than this reference distance by a distance between 0.2 mm and 3 mm. As a variant, this length of the minor axis of the upper elliptical arc according to the first embodiment of the invention is reduced by at least 5%, or even by at least 10%, with respect to this length of the reference elliptical arc.

For example, the value of OM1 is about 13.5 mm and the value of OM2 is about 12.2 mm.

In this first embodiment, the lower elliptical arc 42 corresponds to the reference elliptical arc 143 described above.

FIG. 5 illustrates an optical device 1 according to a second embodiment of the present invention.

In this second embodiment, the eccentricity of the lower elliptical arc 42 is accentuated with respect to the eccentricity of a reference elliptical arc that would permit the light rays output from the exit dioptric interface 4 to be mutually parallel in the direction of the optical axis X (dashed in FIG. 5).

In other words, in this embodiment, the distance of the minor axis of the lower elliptical arc OM'2 is larger than the reference distance OM'1 allowing mutually parallel refracted rays to be obtained. Thus, the light rays 52 generated by the light source 5 and refracted by the lower elliptical arc 42 of the exit dioptric interface 4 are deviated away from the optical axis X in a vertical plane. In a vertical plane, the light rays 52 refracted by the lower elliptical arc 42 of the exit dioptric interface 4 thus converge toward the ground on which the vehicle rests. They for example allow illumination of the immediate vicinity of a vehicle.

At their intersection with the optical axis X, there is still a continuity between the lower elliptical arc 42 of the exit dioptric interface 4 and the upper elliptical arc 41.

The distance OM'2 of the minor axis of the lower elliptical arc 42 is larger than the reference distance OM'1 allowing refracted rays parallel to the optical axis X to be obtained. Preferably, the distance OM'2 of the minor axis of the lower elliptical arc is larger than the reference distance OM'1 by at least 0.3 mm, or even by a length comprised between 0.3 mm and 6 mm. As a variant, this length of the minor axis of the lower elliptical arc according to the first embodiment of the invention is increased by at least 5%, or even by at least 10%, with respect to this length of the reference elliptical arc.

For example, the value of OM'1 is about 13.5 mm and the value of OM'2 is about 16.2 mm.

In this second embodiment, the upper elliptical arc 41 corresponds to the reference elliptical arc 143 described above.

FIG. 6 illustrates an optical device 1 according to a preferred third embodiment of the present invention.

In this third embodiment, the upper elliptical arc 41 of the exit dioptric interface 4 is similar to that of the first embodiment described above and illustrated in FIG. 4. In addition, in this third embodiment, the lower elliptical arc 42 of the exit dioptric interface 4 is similar to that of the second embodiment described above and illustrated in FIG. 5.

The light rays 51, 52 output from the lens 2 are thus all deviated downward, and therefore toward the ground on which a vehicle rests. This embodiment advantageously allows portions of the road that are very close to the vehicle, for example the lateral regions of the vehicle, to be illuminated, without however having to incline the optical device, the optical axis X of which remains horizontal.

Figure 7:
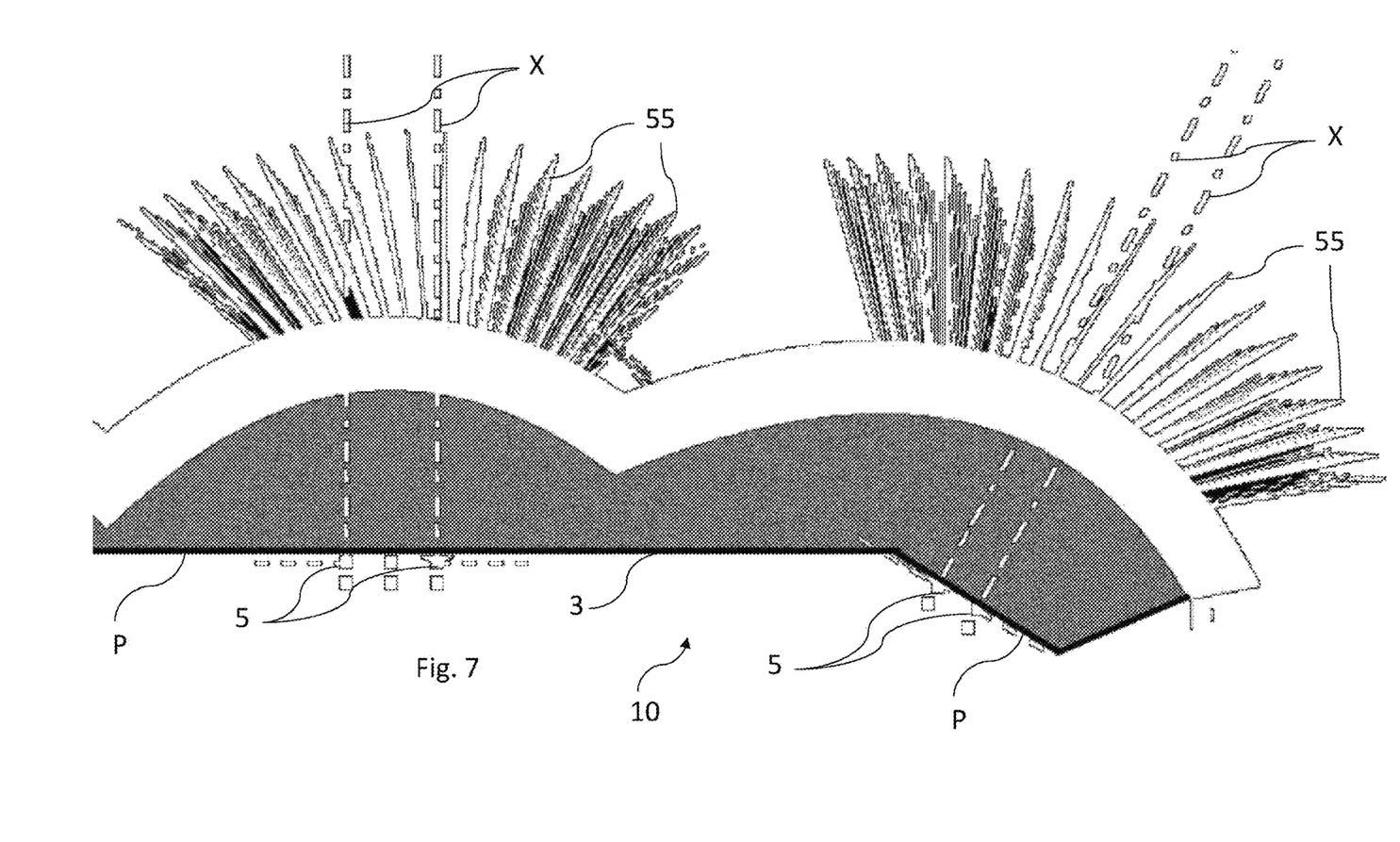
FIG. 7 shows a top view of one embodiment of a lighting system according to the present invention, comprising a plurality of optical devices side view of an optical device.

According to another embodiment, an optical device may comprise a plurality of lenses, which may be identical or different. FIG. 7 illustrates such an embodiment, in which an optical device 1 comprises two lenses 2 according to the present invention.

The optical device 1 may comprise a plurality of lenses 2 the optical axes of which are all included in the same horizontal plane, the focal planes P of each lens 2 possibly being secant so as to enhance the beam of light rays 55 projected by the optical system 10.

In one embodiment, by "elliptical arc", what is meant is a segment having a substantially elliptically arcuate shape.

Naturally, the invention is not limited to the described embodiments. In particular, the exit dioptric interface 4 could have another substantially elliptically arcuate or substantially elliptically arcuate shape in cross sections through a lateral vertical plane, i.e. a vertical plane parallel to the optical axis of the optical device. Thus, the upper portion, above the optical axis, of such a section of the exit dioptric interface 4 could have an elliptically arcuate shape or an almost elliptical shape, inscribed inside the reference outline defined with reference to FIG. 3, so as to deflect toward the optical axis the rays output from the exit dioptric interface 4. Conversely, in addition or as a variant, the lower portion of such a section through the same vertical plane of the exit dioptric interface 4 could have an elliptically arcuate shape or an almost elliptical shape, inscribed outside the reference outline defined with reference to FIG. 3, so as to deflect the rays output from the exit dioptric interface 4 away from the optical axis. The adjectives "inside" and "outside" are understood to mean relatively to the lens 2. Finally, the exit dioptric interface may have any substantially elliptical shape comprised between the reference ellipse defined above and a second ellipse formed via a reduction in the length of the minor axis of the reference ellipse by 30% in the upper portion or an increase in the length of the minor axis of the reference ellipse of 30% in the lower portion. It is thus possible to form a multitude of embodiments.

The invention also relates to a lighting system 10 intended to be mounted on the rocker panel of a vehicle, especially a motor vehicle, comprising a plurality of optical devices 1 such as described above. Lastly, it relates to a motor vehicle, preferably an autonomous motor vehicle, comprising one or more optical devices or lighting systems such as described above and arranged in the lower and lateral portion of the motor vehicle.

What is claimed is:

1. An optical device for a vehicle, comprising:
    at least one lens, the at least one lens including an optical axis, an exit dioptric interface, an entrance dioptric interface, and a lateral face arranged between the entrance dioptric face and the exit dioptric face;
    a light source arranged to emit light toward the entrance dioptric interface of the at least one lens, the at least one lens having an object focal point located substantially on the entrance dioptric interface of the at least one lens along the optical axis; and
    wherein a section of the exit dioptric interface through a vertical plane parallel to the optical axis of the at least one lens comprises one or more arcs that are elliptical or substantially elliptical, and modified with respect to a reference elliptical shape that would cause all the rays generated by the light source to be emitted parallel to the optical axis of the at least one lens, on exiting a reference exit dioptric interface, this modification being such that all or some of the rays emitted by the at least one lens of the optical device are similarly inclined in a direction not parallel to the optical axis, in a manner suitable for an illumination of the ground when the optical device is arranged within a motor vehicle with its optical axis horizontal, and the exit dioptric interface being divided by the vertical plane into an upper portion and a lower portion, with the upper portion being non-symmetrical to the lower portion.

2. The optical device as claimed in claim 1, wherein the upper portion includes one or more arcs that are elliptical or substantially elliptical, and modified with respect to the reference elliptical shape that would cause all the rays to be emitted parallel to the optical axis of the at least one lens, so that all or some of the rays emitted by the upper portion of the at least one lens are inclined toward the optical axis of the at least one lens.

3. The optical device as claimed in claim 1, wherein the upper portion includes one or more arcs that are elliptical or substantially elliptical, and inscribed between a reference elliptical outline that would cause all the rays to be emitted parallel to the optical axis of the at least one lens and an elliptical outline obtained by decreasing the length of a minor axis of the reference elliptical outline by 30%.

4. The optical device as claimed in claim 1, characterized in that a wherein the upper portion includes an upper elliptical arc and a lower elliptical arc, the upper elliptical arc and the lower elliptical arc are separated by a continuous border at an intersection of the upper elliptical arc and the lower elliptical arc with the optical axis, the upper elliptical arc and the lower elliptical arc having a same center and a same focal point coincident with the object focal point of the at least one lens, and characterized in that the upper elliptical arc and the lower elliptical arc has an eccentricity allowing the light rays generated by the light source to be deflected so as to incline them toward or incline them away from the optical axis.

5. The optical device as claimed in claim 4, wherein the length of a minor axis of the upper elliptical arc is 5 to 30% smaller than the length of a minor axis of a reference elliptical arc.

6. The optical device as claimed in claim 4, wherein the length of a minor axis of the lower elliptical arc is 5 to 30% larger than a length of a minor axis of a reference elliptical arc.

7. The optical device as claimed in claim 1, wherein the rays output from the exit dioptric interface are all oriented toward a horizontal plane parallel to the optical axis, and are all able to illuminate a ground on which a vehicle in which the optical device might be mounted would rest.

8. The optical device as claimed in claim 1, wherein the exit dioptric interface is arranged perpendicular to the optical axis.

9. The optical device as claimed in claim 1, wherein the light source is placed in proximity to the entrance dioptric interface, with a distance between the light source and the entrance dioptric interface being 10 mm or less.

10. The optical device as claimed in claim 1, wherein the light source is contiguous with the entrance dioptric interface.

11. The optical device as claimed in claim 1, wherein the lateral face is arranged to contain the emission cone formed by light rays emitted by the light source and propagating through the at least one lens.

12. The optical device as claimed in claim 1, wherein a section of the exit dioptric interface through a horizontal plane containing the optical axis has a substantially parabolic shape.

13. The optical device as claimed in claim 1, wherein the lower portion includes one or more arcs that are elliptical or substantially elliptical, and modified with respect to the reference elliptical shape that would cause all the rays to be emitted parallel to the optical axis of the at least one lens, so that all or some of the rays emitted by the lower portion of the at least one lens are inclined so as to diverge from the optical axis of the at least one lens.

14. The optical device as claimed in claim 1, characterized in that wherein the lower portion includes one or more arcs that are elliptical or substantially elliptical, and inscribed between a reference elliptical outline that would cause all the rays to be emitted parallel to the optical axis of the at least one lens and an elliptical outline obtained by increasing the length of a minor axis of the reference elliptical outline by 30%.

15. The optical device as claimed in claim 1, wherein the exit dioptric interface is larger than the entrance dioptric interface.

16. The optical device as claimed in claim 1, wherein the entrance dioptric interface is arranged substantially symmetrically around an entrance central point, the exit dioptric interface is arranged substantially symmetrically around an exit central point, and the optical axis connects the entrance central point and the exit central point.

17. The optical device as claimed in claim 1, wherein an entrance plane includes the entrance dioptric interface and is perpendicular to the optical axis.

18. A rocker panel of a vehicle, comprising a lighting system with the lighting system including a plurality of optical devices, each of the plurality of optical devices including:
at least one lens, the at least one lens including an optical axis, an exit dioptric interface, an entrance dioptric interface, and a lateral face arranged between the entrance dioptric face and the exit dioptric face;
a light source arranged to emit light toward the entrance dioptric interface of the at least one lens, the at least one lens having an object focal point located substantially on the entrance dioptric interface of the at least one lens on the optical axis; and
wherein a section of the exit dioptric interface through a vertical plane parallel to the optical axis of the at least one lens comprises one or more arcs that are elliptical or substantially elliptical, and modified with respect to a reference elliptical shape that would cause all the rays generated by the light source to be emitted parallel to the optical axis of the at least one lens, on exiting a reference exit dioptric interface, this modification being such that all or some of the rays emitted by the at least one lens of the optical device are similarly inclined in a direction not parallel to the optical axis, in a manner suitable for an illumination of the ground when the optical device is arranged within a motor vehicle with its optical axis horizontal, and the exit dioptric interface being divided by the vertical plane into an upper portion and a lower portion, with the upper portion being non-symmetrical to the lower portion.

19. A motor vehicle, comprising one or more optical devices arranged in a lower and lateral portion of the motor vehicle, the one or more optical devices including:
at least one lens, the at least one lens including an optical axis, an exit dioptric interface, an entrance dioptric interface, and a lateral face arranged between the entrance dioptric face and the exit dioptric face;

a light source arranged to emit light toward the entrance dioptric interface of the at least one lens, the at least one lens having an object focal point located substantially on the entrance dioptric interface of the at least one lens on the optical axis; and wherein a section of the exit dioptric interface through a vertical plane parallel to the optical axis of the at least one lens comprises one or more arcs that are elliptical or substantially elliptical, and modified with respect to a reference elliptical shape that would cause all the rays generated by the light source to be emitted parallel to the optical axis of the at least one lens, on exiting a reference exit dioptric interface, this modification being such that all or some of the rays emitted by the at least one lens of the optical device are similarly inclined in a direction not parallel to the optical axis, in a manner suitable for an illumination of the ground when the optical device is arranged within a motor vehicle with its optical axis horizontal, and the exit dioptric interface being divided by the vertical plane into an upper portion and a lower portion, with the upper portion being non-symmetrical to the lower portion.

* * * * *